United States Patent Office 3,180,693
Patented Apr. 27, 1965

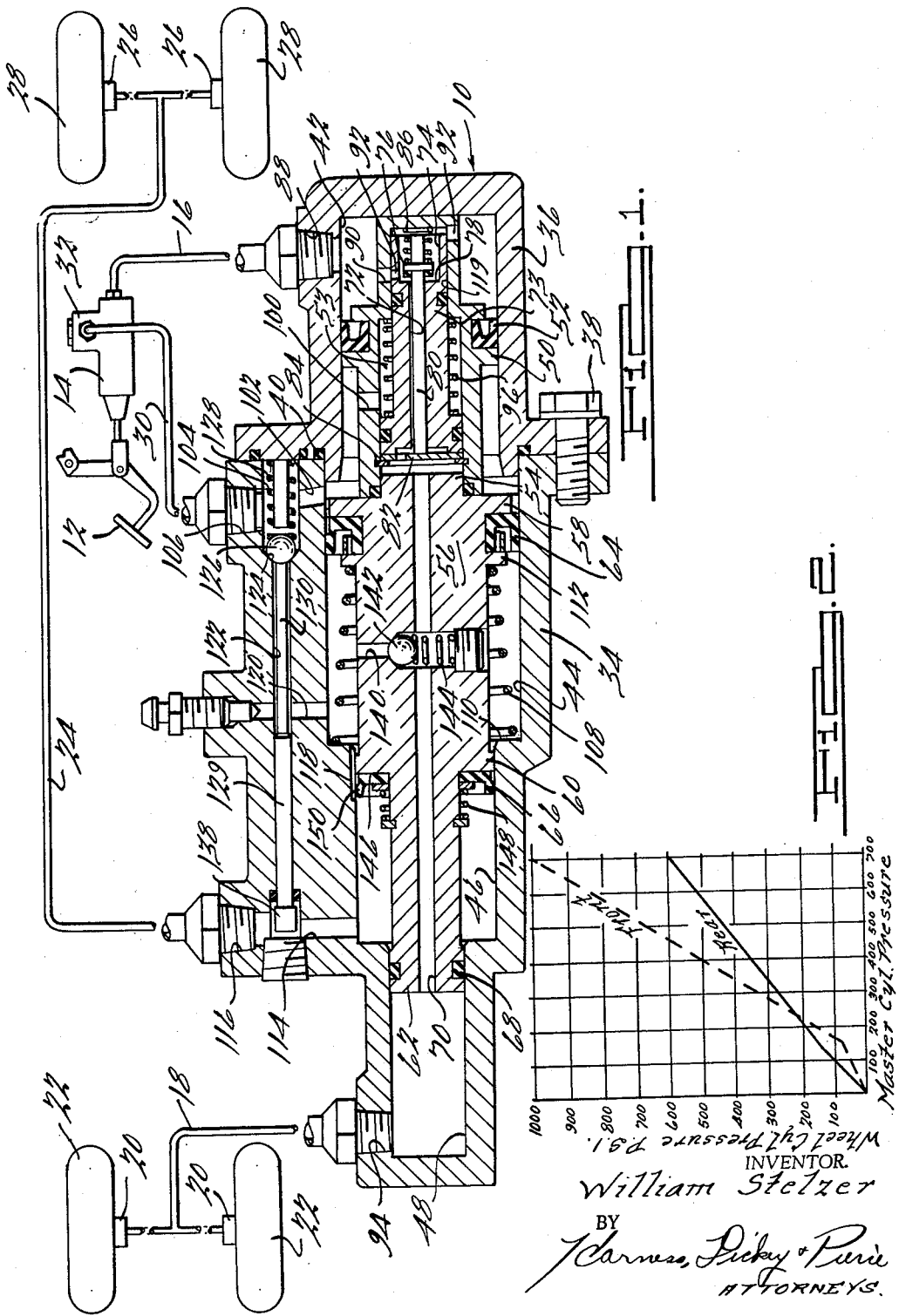

3,180,693
HYDRAULIC BRAKE SYSTEM AND PRESSURE
REGULATING DEVICE THEREFOR
William Stelzer, Bloomfield Hills, Mich., assignor to
Kelsey-Hayes Company, Romulus, Mich., a corporation
of Delaware
Filed Sept. 11, 1963, Ser. No. 308,269
7 Claims. (Cl. 303—6)

This invention relates to hydraulic brake systems for vehicles, and particularly to a pressure transmitting device operable to deliver brake fluid under varying pressures and in differing volumes from the master cylinder to the front and rear wheel brake cylinders in a vehicular hydraulic brake system.

In the brake industry it is well known that the maximum braking effort of which the front and rear wheels of a vehicle are capable without skidding varies with the rate of deceleration of the vehicle. This is because of the fact that, during braking, a couple is produced about the center of mass of the vehicle which transfers a portion of the weight of the vehicle from the rear wheels to the front wheels. The braking effort of which a wheel is capable varies directly with the percentage of the vehicle weight borne by such wheel. Accordingly, as the rate of deceleration is increased, a greater percentage of the braking force may be applied through the front wheels without producing skidding.

Conventionally, the percentage of braking effort sought to be derived from the front and rear wheel brakes is static, this ratio generally being controlled by the relative sizes of the front and rear wheel brake cylinders. In such brake systems, if the rear brake cylinders are made very small compared to the front, then, excessive wear results on the front brake linings and the rear brakes do not deliver the full braking effort of which they would otherwise be capable at normal low rate of deceleration stops. On the other hand, if the front brake cylinders are not made large enough the vehicle is subject to premature rear wheel skidding during full power high-speed braking. Under such conditions, it requires a longer distance in which to stop the vehicle and control of the vehicle is easily lost.

In addition to the problems produced by weight transfer, modern braking systems may use different types of brakes on the front and rear wheels which have differing fluid volume and pressure requirements. An example of one such system involves the use of disc brakes on the front wheels and the use of so-called "Duo Servo" drum brakes on the rear wheels. Duo Servo brakes with heavy retraction springs generally require a high level of hydraulic pressure to overcome the force of the retraction springs and merely bring the brake shoes into contact with the braking surface of the drum. In contrast, disc brakes are effective to deliver some braking effort at a very low pressure inasmuch as any retraction springs which are used in disc brakes are generally of a very low strength. It has also been found that disc brakes are subject to what has been termed "pad knockoff." This expression refers to the displacement of the disc brake linings away from the normal planes of the braking surfaces of the disc as a result of the deflection of the disc produced by bumps or the like on the driving surface. Under such circumstances, a large volume of fluid is required to move the disc pads or linings into contact with the disc prior to the application of any actual braking load to the wheels. It is, of course, desirable to accomplish this lining movement without excessive pedal travel.

Workers in the brake field have heretofore proposed various devices to compensate for the weight transfer between the rear and front wheels. However, such devices have almost always involved some loss in the total braking effort produced for a given pedal effort. Furthermore, such devices have made no provision for initially differing volume and pressure requirements of front and rear brakes. Accordingly, it is an object of the present invention to provide a pressure transmitting device for hydraulic brakes which is operable both to modulate the pressure delivered to the front and rear brake cylinders substantially in accordance with the dynamic weight transfer and which is also operable to compensate for the varying volume and pressure requirements of front and rear brakes to bring the linings of such brakes rapidly into contact with their associated braking surfaces.

It is another object of the present invention to provide a pressure transmitting brake of the above character in which the ratio of pedal effort to hydraulic pressure delivered to the brakes during a high deceleration stop is relatively low.

It is another object of the present invention to provide a pressure transmitting device of the above character which is operable to stop the vehicle on which it is used in a relatively short distance without premature rear wheel skidding and without excessive brake pedal travel.

It is another object of the present invention to provide a pressure transmitting device of the above character which eliminates the necessity for the conventional residual valve employed in master cylinders of hydraulic brake systems.

It is still another object of the present invention to provide a pressure transmitting device of the above character in which increasing master cylinder pressure produces a smooth gradually increasing level of wheel cylinder pressure without sudden rapid increases in wheel cylinder pressure or undesired periods of constant wheel cylinder pressure, thereby avoiding any abrupt or sudden application of braking force at the front or rear wheels.

It is another object of the present invention to provide a pressure transmitting device of the above character which is reliable in operation; which is not subject to external leakage of brake fluid; which is sturdy in construction and which may be manufactured at a relatively low initial cost.

These and other objects of the present invention will become apparent from the following detailed description taken in conjunction with the accompanying drawings, wherein:

FIGURE 1 is a longitudinal sectional view of the pressure transmitting device of the present invention shown in association with a diagrammatically represented brake system, and FIGURE 2 is a graph showing the front and rear wheel brake pressures as a function of the master cylinder brake pressure in a brake system employing the device of the present invention.

Referring now to the drawings, the device of the present invention, shown at 10, is illustrated interposed in a passenger brake system having the usual brake pedal 12 and master cylinder 14. The device is arranged to receive brake fluid under pressure from a conduit 16 connected to the outlet of the master cylinder 14 and to deliver brake fluid through a conduit 18 to the brake cylinders 20 of the rear wheels 22 of the vehicle. The device 10 also delivers fluid under pressure through a conduit 24 to the brake cylinders 26 of the front wheels 28 of the vehicle. A return conduit 30 leads from the device 10 to the brake fluid reservoir 32 of the master cylinder 14.

The proportioning device 10 includes a housing which may be conveniently formed in two housing portions 34 and 36 secured together by any suitable fastening, such as cap screws 38, and with a suitable seal, such as an O-ring 40, interposed between the mating faces thereof. The housing 34–36 is closed at its opposite ends and is formed with coaxial bores of varying diameter, each bore defining a piston and fluid receiving chamber. The housing portion 36 has a bore defining a chamber 42 while the housing portion 34 has a plurality of bores defining chambers 44, 46 and 48, each of successively decreasing diameter. The chambers 42, 44, 46 and 48 are interconnected and are coaxially arranged. The chamber 44 is of greater diameter than the chamber 42, while the chamber 46 and 48 are each smaller than the chamber 42. The piston 50 is operably disposed in the chamber 42 and has an annular unidirectionally acting seal 52 slidably sealingly contacting the wall of said chamber. This piston 50 is formed with an axial bore defining a chamber 53 open to the left-hand end thereof. An extension 54 of a piston 56 is fitted in the chamber 53 to join the piston 56 to the piston 50. The piston 56 will be seen to have fluid displacing piston portions 58, 60 and 62 adapted to operate within the chambers 44, 46 and 48 respectively. The piston portion 58 is provided with an annular unidirectionally acting seal 64 sealingly contacting the wall of the chamber 44, the piston portion 60 is provided with an annular unidirectionally acting seal 66 sealingly and slidably engageable with the wall of the chamber 46, and the piston portion 62 is provided with an O-ring seal 68 sealingly engaging the wall of the chamber 48. The piston 56 has a centrally located axially extending through passage 70 communicating with a passage 72 extending throughout the length of a piston 73 operably disposed in the chamber 53. The passage 72, in turn, communicates with the chamber 42 through ports 90 and 92 formed in the pistons 50 and 73, respectively.

From the foregoing, it will be seen that the pistons 50 and 56 are joined for movement together and may be considered as one member. Upon the pressurization of the right-hand end of the chamber 42 the pistons 50 and 56 move to the left (as viewed in the drawing) to displace fluid to the front wheel brake cylinders 26 and pressurize said cylinders. The rear wheel brake cylinders, however, are initially pressurized by the direct flow of fluid from the chamber 42 to the chamber 48 through the passages 70 and 72. By this means a pressure is developed in the chamber 48 (and, thus, in the rear wheel brake cylinders 20) equal to the master cylinder brake pressure present at the right-hand end of the chamber 42. Therefore, the passages 70 and 72 may be characterized as "by-pass" means for the direct flow of fluid to the rear brakes past the pistons. The effect which this arrangement has upon the initial volume and pressure of fluid delivery to the brake cylinders will be subsequently considered.

The pressurization of the brake cylinders in the foregoing manner prevails from the beginning of brake application until a preselected master cylinder pressure has been reached. At this point a change in the arrangement for pressurizing the brake cylinders is made and this change is activated by the closure of the by-pass means defined by the passages 70 and 72. A valve element 76 for closing the by-pass means is located within a counter bore 74 formed in the right-hand end of the passage 72.

A valve element 76 is adapted to seal against an end wall 78 of the counter bore 74 and close off the flow of fluid through the passage 72. The valve element 76 has a valve stem 80 connected at its left-hand end to an apertured plate 82 abutting a split lock ring 84 carried by the piston 50. A positioning spring 86, seated against the right-hand end of the chamber 53, holds plate 82 against the ring 84 and, thus, maintains the valve element 76 in a fixed position with respect to the piston 50.

Brake fluid under pressure flows into the chamber 42 through a housing inlet opening 88 connected to the conduit 16. From the chamber 42, master cylinder fluid pressure has access to the left-hand end of the piston 73 through the ports 90 and 92 and the passage 72. During initial braking the piston 73 is biased against the plate 82 by a spring 96 which is seated against a radial shoulder 98 formed in the piston 50 at one end of the chamber 53. The spring 96 is of a selected strength to yield when the fluid pressure acting against the left-hand end of the piston 73 is of a given value. When the spring 96 yields, fluid pressure moves the piston 73 to the right causing the valve element 76 to seal against the wall 78 and close off the passages 70 and 72 from master cylinder pressure. The chamber 53 and the piston 73 are both of stepped diameter providing an annular space occupied by the spring 96. This space is vented through a port 100 in the piston 50 to an annular clearance space in the chambers 42 and 44 between the seals 52 and 64. This space is, in turn, vented through a port 102 in the housing portion 34 to a chamber 104, also formed in the housing portion 34. The chamber 104 is in communication with housing opening 106 connected to the conduit 30, leading to the fluid reservoir 32. By this means the annular space occupied by the spring 96 and the annular space between the seals 52 and 64 are maintained at atmospheric pressure.

Prior to brake operation the pistons 50 and 56 are maintained in the positions illustrated, with the piston 50 bearing against the end wall of the housing portion 36. This is accomplished by means of a spring 108 which bears at its one end against an annular shoulder 110 of the housing portion 34 and its other end against an annular radially outwardly extending flange 112 formed on the piston portion 56 to the left of the seal 64. As fluid pressure is generated within the chamber 42 it acts against the right-hand side of the piston 50 and moves the pistons 50 and 56 to the left against the force of the spring 108. In so doing the piston portions 58 and 60 will displace fluid through a housing passage 114 leading to an outlet opening 116 in the housing portion 34 connected to the conduit 24 and the front wheel cylinders 26. Fluid in the chamber 44 is displaced to the chamber 46 past the unidirectionally acting seal 66 when the fluid in the chamber 44 is at a higher pressure. It will be noted that the bore defining the chamber 46 has a plurality of axially extending grooves 118 adjacent the right-hand end thereof, which initially provide a bypass past the seal 66. However, the grooves 118 are merely for the relief of pressure in the chamber 46 upon the release of the brakes and fluid is still free to pass from the chamber 44 to the chamber 46 even when the seal 66 is out of registry with the grooves 118.

The spring 108 is a light-weight return spring and while it offers some resistance to piston movement, this may be allowed for in the design. Accordingly, the pressure of the fluid displaced to the front wheel cylinders will bear a definite known relationship to master cylinder pressure. Disregarding the spring 108, the ratio of the two pressures is equal to the inverse ratio of the effective piston area involved. The effective area of the piston portions 58 and 60 pressurizing fluid to the front wheel cylinders 26 is equal to the cross-sectional area of the chamber 44 less the cross-sectional area of the chamber 48. The effective area of the piston 50 subject to the biasing force of master cylinder pressure equals the cross-sectional area of the chamber 42 less the cross-sectional area of the chamber 48 (it being apparent that fluid in the chamber 48 opposes the force of fluid in the chamber 42 moving the piston 50 to the left). The combined effective areas of the piston portions 58 and 60 being greater than the effective area of the piston 50 during initial operation of the device, the pressure of fluid delivered to the front wheel cylinders will be less than master cylinder pressure and, thus, less than the pressure delivered to the rear wheel brake cylinders 20. Furthermore, the large areas of the piston portions 58 and 60 assure a large volume fluid flow to the front brakes to compensate for any greater volume requirement of the front brakes, such as is occasioned by "pad knock off."

When the pressure of the fluid in the chamber 42 produced by the master cylinder 14 has reached a selected level, the "by-pass" provided by the passage 70 and 72 is closed to initiate the aforementioned gradual change in the ratio of front and rear brake cylinder pressures. The closure of said by-pass by the valve element 76 results from the yielding of the spring 96. The spring 96 initially maintains the piston 73 in the illustrated positions. However, the piston 73 is subjected to a force from fluid pressure in the left-hand end of the chamber 53 of the piston 50 attempting to compress the spring 96. The piston 73 has a large diameter end sealingly slidable in the chamber 53 and also a small diameter end sealingly slidable in a small bore 119 which forms an extension of the chamber 53 at the right-hand end thereof. Master cylinder pressure acts against the small diameter end of the piston 73. Accordingly the effective area of the piston 73 subject to fluid pressure for movement against the spring 96 equals the cross-sectional area of the chamber 53 less the cross-sectional area of the bore 119. The strength of the spring 96 is selected so that the spring will yield at the desired master cylinder pressure, as for example, 150 p.s.i. When the spring yields the piston 73 moves to cause its wall 78 to seal against the valve element 76, thereby closing the "by-pass."

When the valve 76 closes, the forces produced by fluid pressure acting on the opposite sides of the piston assembly 50–56 are in balance. The total force produced by the fluid in chamber 42 acting against the piston 50 over the whole cross-sectional area of the chamber 42 equals the forces produced by fluid pressure in the chambers 44, 46 and 48 acting against the effective areas of the piston portions 58, 60 and 62, respectively. After closure of the valve 76, the relative proportion of the reactive force attributable to each of the piston portions 58, 60 and 62 undergoes a gradual but marked change. The result of this change may be seen by reference to the exemplary chart of FIGURE 2 wherein it is assumed that the valve 76 closes at 150 p.s.i. master cylinder pressure. Thereafter, it will be seen that the proportion of pressure at the front brake cylinders increases and the proportion of pressure at rear brake cylinders decreases. This is desirable in order to cause the braking effort of the front and rear wheel brakes to closely approximate the proportion of the weight of the vehicle borne by such wheels. In this connection, it is assumed that during high energy stops the weight transfer will vary in accordance with master cylinder pressure. While this is an approximation only, tests have indicated that the relationship is sufficiently close that highly desirable results may be obtained when using master cylinder pressure as a measure of weight transfer. From the foregoing it will be apparent that the ratio of the pressure in the chamber 46 compared to the pressure in the chamber 48 increases with increasing master cylinder pressure.

It will be apparent that with the closure of the by-pass further pressurization of front and rear wheel cylinders is solely dependent upon the fluid displaced to them by the piston portions 58, 60 and 62. Also, in the absence of other influences, the relative pressures in the front and rear wheel brake cylinders will depend on the relative areas of the piston portions displacing fluid to them. In the illustrated embodiment of the invention the various bore shaped chambers of the housing 34–36 may, for exemplary purposes, be considered to have the following cross-sectional areas: Chamber 42—1.5 sq. inches, chamber 44—2.4 sq. inches, chamber 46—1.2 sq. inches and chamber 48—.3 sq. inch. The effective areas of the piston portions 58 and 60 are, therefore, 2.1 sq. inches and .9 sq. inch, respectively. It will, thus, be seen that the piston portion 60 is, by itself, effective to deliver a greater volume of fluid to the front brakes than the piston portion 62 is capable of displacing to the rear brakes. The primary consideration, however, is that after closure of the by-pass, the volumes of fluid displaced to the front and rear brakes are in a fixed ratio.

The device of the present invention is designed so that after closure of the valve 76 displacement of fluid to the front wheel brake cylinders is accomplished solely by the piston portion 60. This results from the provision of fluid venting means for the chamber 44. This means includes a housing passage 120 leading from the chamber 44 to a passage 122 in communication with the chamber 104. This provides a path for the flow of brake fluid from the chamber 44 to the master cylinder reservoir, which is always at atmospheric pressure. During initial brake application this path is closed by a ball valve 126 sealing against an annular conical valve seat 124 at one end of the chamber 104 and surrounding one end of the passage 122. The ball valve 126 is normally kept closed by a spring 128. The spring 128 is designed to yield at the same time as the spring 96, operatively associated with valve element 76. The spring 128 is initially overcome solely by the force exerted against the ball valve 126 by fluid in the passage 122, which is at the same pressure as fluid in the chamber 44. By this means the further buildup of pressure in the chamber 44 after closure of the valve 76 is arrested.

The elimination of the piston portion 58 as a brake cylinder pressurizing media reduces the overall area of the piston assembly reacting against brake fluid in opposition to the applying force of master cylinder pressure against the piston 50. In the illustrated example, the piston portions 60 and 62 have effective areas of .9 sq. inch and .3 sq. inch for a total of 1.2 sq. inches which is less than the gross area of the piston 50. Thus a gain in the total pressure delivered to the brake system results from the use of the device and a smaller power booster may be used where it is desired to employ a power booster in a brake system in which the device of the present invention is used. Nevertheless, the additional piston portion 58 does give added volume of fluid displacement during initial brake application to compensate for initial high volume requirements of front brakes.

It will be apparent that the presence of fluid under pressure in the chamber 44 after closure of the valve element 76 constitutes a needless resistance to the movement of the piston assembly 50–56. If this pressure were immediately released in its entirety, front wheel brake pressure would undergo a very sudden and irregular increase, and a simultaneous irregular change in rear wheel brake pressure would result. In order to produce a gradual bleeding off of fluid pressure in the chamber 44 and produce the desirable gradual modulation of brake pressure depicted in FIG. 2, a plunger 129 is reciprocally positioned in the passage 122 with a head portion 138 disposed in the passage 114 for exposure to front brake cylinder pressure. The plunger 129 has a reduced diameter stem 130 engageable with the ball valve 126. Fluid is free to flow around the stem 130 in the passage 122 between the chamber 44 and the ball valve 126. At the time of closure of the valve 76, the pressures acting against the opposite ends of the plunger 129 are equal. Accordingly, the plunger 129 applies no force to the ball valve 126. However, the front brake cylinder pressure acting against the plunger head 138 rises as master cylinder pressure rises, while the pressure in chamber 44 tends to remain static. Therefore, the plunger stem 130 is biased against the ball valve 126. This reduces the pressure in chamber 44 needed to open the ball valve 126 and bleed off fluid from the chamber 44. The biasing force of the plunger 129 against the ball valve 126 increases as master cylinder pressure increases until eventually the pressure in chamber 44 is reduced to atmospheric pressure.

Reverting briefly to the unidirectionally acting seal 66, it will be seen that this seal is held against a radial piston shoulder 146 by a spring 148 and is provided with a thin flexible lip around its periphery. The lip 150 is inclined outwardly and forwardly. Where a greater pressure exists ahead of than behind the seal, fluid pressure forces the lip against the wall of the chamber 46. Where the reverse pressure condition prevails, however, the lip 150 is forced inwardly permitting the flow of fluid from behind the seal forwardly past the seal. By this means the output of the piston portion 58 is added to the output of the piston portion 60 prior to closure of the valve element 76.

The device of the present invention may be designed to change the arrangement for pressurizing the brake cylinders at any desired pressure. Furthermore, any desired relative quantities of fluid may be displaced to the brake cylinders. The particular volumes and pressures shown herein are illustrative only. Purely by way of example in the illustrated embodiment, the brake pressure at the front brake cylinders 26 is 70 p.s.i. at the time of the closure of the valve element 76. This results from the difference in effective piston areas and the force of the spring 108. While the pressure at the rear wheel cylinders is 150 p.s.i. at the same time, this higher pressure is desirable to overcome the heavy return springs when using Duo Servo brakes on the rear wheels. Accordingly, the linings of front disc brakes and rear Duo Servo brakes will begin to apply braking load to their respective wheels at about the same time and in the desired amounts.

In order to assist in the release of brake pressure from the front brake cylinders a pressure relief passage 140 provides communication in the piston 56 from the chamber 44 to the passage 70. This is normally closed by a ball check valve 142 held against a valve seal in the passage 140 by a spring 144. Whenever the pressure in chamber 44 is greater than the pressure in the passage 70, the check valve 142 will open to bleed off fluid.

While it is apparent that the preferred embodiment illustrated herein is well calculated to fulfill the objects above stated, it will be appreciated that the invention is susceptible to change, modification and variation without departing from the fair meaning or proper scope of the subjoined claims.

What is claimed is:

1. In an hydraulic brake system for a vehicle having a master cylinder, a pair of front wheel brake cylinders, and a pair of rear wheel brake cylinders, a pressure transmitting device connected between the master cylinder and the brake cylinders, said device including a piston means having first, second and third piston portions, said first piston portion being arranged to displace fluid to the rear brake cylinders, said second and said third piston portions being arranged to displace fluid to the front brake cylinders, a bypass for the direct flow of fluid pressure from the master cylinder to just one pair of said brake cylinders past said piston means, valve means for closing said bypass after a predetermined initial brake application and means for discontinuing the displacement of fluid to the front brake cylinders by said third piston portion after a selected initial brake application whereby the front brake cylinders will be pressurized solely by said second piston portion during braking subsequent to said selected brake application.

2. The structure set forth in claim 1 in which said piston means is operatively disposed in a housing having interconnected coaxial bores receiving said second and said third piston portions, respectively, and in which said second piston portion is provided with a unidirectionally acting seal engageable with the wall of its associated bore, said seal being operable to permit the flow of fluid thereby when the fluid being displaced by said third piston portion is of a greater pressure than the fluid being displaced by said second piston portion.

3. The structure set forth in claim 1 in which said last named means includes a pressure relief valve and a member engageable with said pressure relief valve for biasing said pressure relief valve in an open direction with a force proportional to the differential pressure between the fluid displaced by said second piston portion and the fluid displaced by said third piston portion.

4. In a hydraulic brake system for a vehicle having a master cylinder, front wheel brake cylinders and rear wheel brake cylinders, a pressure transmitting device connected between the master cylinder and the brake cylinders, said device including a housing having first, second, third and fourth interconnected coaxial bores, a piston assembly having first, second, third and fourth piston portions operatively disposed in said first, second, third and fourth bores, respectively, said fourth piston portion being provided with a bore therein, a valve operating piston operatively disposed in the bore of said fourth piston portion, bypass means through said first, second, third and fourth piston portions and through said valve operating piston, a valve element operatively associated with said valve operating piston, a spring biasing said valve operating piston in a direction away from said valve element, said valve operating piston having an effective area exposed to master cylinder pressure during initial braking which tends to move said valve operating piston in a direction in which it closes with said valve to close said bypass means, said housing having a vent passage for said third bore, a spring biased pressure relief valve for closing said vent passage, a plunger exposed to the fluid pressure in said second and third bores at the opposite ends thereof and engageable with said pressure relief valve to bias said pressure relief valve in an open direction with a force proportional to the difference in pressures between said second and third bores.

5. In an hydraulic brake system having a pair of front wheel brake cylinders and a pair of rear wheel brake cylinders, a pressure transmitting device operable to pressurize said front and rear wheel brake cylinders, said device including a piston having integrally connected first, second, and third portions, said first portion being arranged to displace fluid to the rear brake cylinders, said second and third portions being arranged to displace fluid to the front brake cylinders, a passage for the flow of fluid pressurized by said third piston portion to the rear brake cylinders when said fluid is at a pressure greater than the pressure of fluid in said rear brake cylinders, and means for discontinuing the displacement of fluid to the front brake cylinders by said third piston portion after a selected initial brake application whereby the front brake cylinders will be pressurized solely by said second piston portion during braking subsequent to said selected brake application.

6. In an hydraulic brake system for a vehicle having a pair of front brake cylinders and a pair of rear brake cylinders, a pressure transmitting device for pressurizing said brake cylinders, said device including a piston having integrally connected first, second and third portions of varying diameters, said first piston portion being arranged to displace fluid to the rear brake cylinders, said second and third piston portions being arranged to displace fluid to the front brake cylinders, and means for discontinuing the displacement of fluid to the front brake cylinders by said third piston portion after a selected initial brake application whereby said front brake cylinders will be pressurized solely by said second piston portion after said selected brake application.

7. In an hydraulic brake system for a vehicle having a pair of front brake cylinders and a pair of rear brake cylinders, a pressure transmitting device for pressurizing said brake cylinders, said device including a piston having integrally connected first, second and third portions of varying diameters, said first piston portion being arranged to displace fluid to the rear brake cylinders, said second and third piston portions being arranged to displace fluid to the front brake cylinders, means for discontinuing the displacement of fluid to the front brake cylinders by said third piston portion after a selected initial brake application whereby said front brake cylinders will be pressurized solely by said second piston portion after said selected brake application, and means for relieving the pressure of fluid displaced by said third piston portion after said selected initial brake application in accordance with the pressurization of the front brakes by said second piston portion.

References Cited by the Examiner
UNITED STATES PATENTS 2,835,271   5/58   Oberthur _____ 188—152
3,097,018   7/63   Stelzer _____ 303—6

EUGENE G. BOTZ, *Primary Examiner.*

FERGUS S. MIDDLETON, *Examiner.*